Patented Dec. 12, 1939

2,182,963

UNITED STATES PATENT OFFICE 2,182,963

COLORATION OF TEXTILE AND OTHER MATERIALS

Henry Dreyfus, London, and Robert Wighton Moncrieff, Spondon, near Derby, England, assignors to Celanese Corporation of America, a corporation of Delaware No Drawing. Application July 29, 1937, Serial No. 156,312. In Great Britain August 13, 1936

6 Claims. (Cl. 8—36)

This invention relates to the coloring with vat dyestuffs of textile and other materials, more particularly such as are made of cellulose acetate or other cellulose ester or ether.

Vat dyestuffs are usually applied to textile materials in the form of aqueous solutions of salts of their leuco compounds, the latter being reduction products of the vat dyestuff. After the textile material has taken up or been impregnated with the leuco compound, the material is subjected to oxidation, usually atmospheric oxidation, so as to convert the leuco compound on the material back to the original vat dyestuff.

According to the present invention leuco compounds of vat dyestuffs are incorporated in cellulose acetate or other cellulose ester or ether textiles by applying them to the textiles in an organic liquid medium comprising an organic base. Such a dye liquid may, for instance, be obtained by dissolving a vat dyestuff in an organic base such as pyridine, reducing the dyestuff with zinc formaldehyde sulphoxylate or other suitable reducing agent, and then diluting with an organic liquid such as petrol. The leuco compounds after incorporation in the materials can be converted into coloring matter by oxidation to the parent vat dyestuff.

Various primary, secondary or tertiary organic bases may be used as a constituent of the liquid medium according to the invention. As examples may be mentioned aliphatic amines or other amines containing an amino group which is not directly attached to an aromatic nucleus, for instance butylamine, amylamine, or other lower alkylamine, cyclohexylamine, N-dimethyl-cyclohexylamine, or other hydroaromatic amine, mono-, di- or tri-benzylamine, dimethyl-benzylamine, or other aralkylamines, dimethyl-aniline or like aromatic amine. Quaternary ammonium compounds, e. g., trimethyl-benzyl-ammonium hydroxide, may be used if desired. Again, bases in which nitrogen forms part of a ring may be used, for example pyridine, alkyl pyridines, quinoline, or polyalkylene amines such as piperidine.

The liquid medium preferably comprises the organic base in compartively small proportion, for example 5 to 15%, the base being diluted with a neutral organic liquid, preferably one of comparatively low boiling point, e. g. below about 120° C. to 150° C.

As examples of suitable neutral organic liquids may be mentioned the following:

(a) Aliphatic hydrocarbons, particularly those boiling below about 120° C., e. g. petrol (gasoline);

(b) Aromatic hydrocarbons, for example benzene, toluene, xylene and the like;

(c) Halogenated hydrocarbons, for example carbon tetrachloride, perchlorethylene, and di- or tri-chlorethylene;

(d) Alcohols, for example methyl or ethyl alcohol, normal or iso-propyl alcohol or a butyl alcohol;

(e) Esters, for example ethyl acetate, propyl- or isopropyl-acetate or other volatile esters having boiling points below about 150° C.

Mixtures of organic bases and/or mixtures of neutral organic liquids can be utilised if desired.

The organic base or the liquid medium containing it may contain small amounts of water. It is to be understood, however, that the major portion of the liquid medium, preferably 90–95% or more, is organic.

Certain combinations of organic base and neutral organic liquid are of particular advantage. Thus, nitrogenous bases in which nitrogen forms part of a ring may with advantage be used in conjunction with a hydrocarbon diluent. For example, pyridine may be used in conjunction with petrol (gasoline), and quinoline in conjunction with xylene.

The liquid medium may be one which has a swelling action on the cellulose acetate or other cellulose ester or ether to be colored. This is particularly advantageous when applying the dye liquids to running threads or when applying them by mechanical impregnation methods as opposed to methods in which the reduced vat dyestuff is absorbed from the dye liquid by the material. To this end the major component of the liquid medium may be one which has the desired swelling action on the material. Again, there may be employed a mixture of a liquid which is a strong swelling agent or even a solvent for the material to be colored, with a liquid of substantially no swelling power such as petrol or carbon tetrachloride. Mention may be made, for instance, of mixtures of petrol or carbon tetrachloride with isopropyl alcohol, acetone, or ethyl acetate.

The dye liquids may be prepared in various ways. A particularly convenient method is to reduce the parent vat dystuff in the presence of the organic base. For this purpose zinc formaldehyde sulphoxylate has been found a particularly convenient reducing agent. Other reducing agents may be employed, however, for example zinc or other reducing metal, or sulphuretted hydrogen. The presence of a small amount of water frequently facilitates the reduction, especially when zinc or other reducing metal is being employed. The presence of a small proportion of a metal more electropositive than the reducing metal is often advantageous, particularly when water is present. For example, when using zinc a little copper may be added, conveniently as an aqueous solution of a copper salt. It is usually preferable to effect the reduction of the vat dyestuff while dissolved or suspended in the organic base alone or in the organic base only slightly diluted with neutral organic liquid.

Another method of preparing the dye liquids is to prepare the free leuco compound of the vat dyestuff, for example by acidification of an alkaline vat, and then to dry this free leuco compound and mix it with the organic base before or after addition of any neutral organic liquid to be employed. If desired dehydration of the precipitated leuco compound may be effected by boiling with an organic liquid which forms with water an azeotropic mixture of minimum boiling point. Advantageously the organic liquid so employed is one which is suitable as a constituent of the dye liquid. Thus wet precipitated free leuco compound may be boiled with benzene so as to distil off water as an azeotropic mixture with the benzene, leaving the free leuco compound in the excess benzene. This suspension may then be mixed with the requisite amount of organic base, with or without any further neutral organic liquid that may be necessary. The preparation of the free leuco compound and the dye liquid containing the organic base should, of course, be carried out under conditions such that no substantial oxidation of the leuco compound to the vat dyestuff occurs. If desired, a reducing agent may be present during a part or the whole of the operations in order to ensure that the vat dyestuff is maintained in the reduced state.

The dye liquids are conveniently applied at temperatures as high as can be used without damaging the material to be colored. For example when coloring cellulose acetate using dye liquids containing a substantial proportion of petrol or carbon tetrachloride, the liquid may be employed at the boil.

The cellulose-acetate or other cellulose-ester or -ether textile may be allowed to absorb the leuco vat dyestuff from the dye liquid; for example cellulose-acetate yarn in hank form, or cellulose-acetate fabric, may be immersed in the dye liquid and allowed to absorb the leuco vat dyestuff therefrom. Again, the dye liquid may be circulated through bobbins or other packages of cellulose-acetate yarn, rolls of fabric or the like, and allowed to absorb the reduced vat dyestuff. The latter is then converted again to the original vat dyestuff on the material by a suitable oxidation process.

The dye liquids may, however, be used in other ways for the incorporation of the leuco vat dyestuff in cellulose ester or ether materials. For example, threads may be run through the liquids. Again, padding, printing or other methods of mechanical impregnation may be employed if desired. For instance, textile material may be treated with the dye liquid in the manner and with the apparatus described in United States applications S. Nos. 124,138, filed February 4, 1937; 123,102, filed January 30, 1937, and 124,139, filed February 4, 1937. As indicated above, it is of advantage when applying the dye liquids to running threads or using methods of mechanical impregnation, to use a liquid medium which has a swelling action on the cellulose acetate or other cellulose ester, or cellulose ether, to be colored.

Various vat dyestuffs may be utilised when dyeing by the new process; special mention may be made of the indigoid vat dyestuffs, in which term we include both indigoid dyestuffs containing a pyrrole nucleus and indigoid dyestuffs containing a thiophene nucleus, or indigoid dyestuffs containing nuclei of each of these types. Another class of dyestuffs which may be applied by the new method is that of the anthraquinone vat dyestuffs containing but a single anthraquinone nucelus, for example anthraquinone 1(NH)-2(CO)-acridones, anthraquinone 1(NH)-2(CO)-naphthacridones, anthraquinone 1(S)-2(CO) thioxanthones, and acidylamino-anthraquinones, e. g., benzoyl amino anthraquinones such as 1:4- and 1:5-di(benzoylamino)-anthraquinones.

After incorporating reduced vat dyestuffs in cellulose acetate (or other cellulose-ester or cellulose-ether textile materials), the latter may be subject to any treatment necessary to convert the reduced vat dyestuff to the parent vat dyestuff. Air oxidation with or without a mild alkaline scour is usually sufficient. If desired a special oxidation treatment may be applied, for example treatment in a weakly alkaline bath containing hydrogen peroxide, sodium perborate or the like.

The new process is of special value for the coloration of cellulose acetate or other cellulose esters or ethers. As examples of such other esters or ethers may be mentioned cellulose formate, propionate or butyrate, and methyl, ethyl and benzyl cellulose. The invention is also applicable in the treatment of esterified cellulose-derivative materials, e. g. textile materials of an organic derivative of cellulose which have been esterified according to the process described in United States application S. No. 39,288, filed September 5, 1935. The textile material may consist of cellulose acetate or other cellulose ester or ether alone, or it may consist of cellulose ester or ether in association with other textile fibres. In this case the other textile fibre may, according to its nature, either be colored by the treatment or it may remain uncolored. Textile materials other than cellulose esters or ethers may also be colored by the new process, more particularly animal fibres such as natural silk or wool.

If desired textile materials containing cellulose-ester or -ether filaments which contain titanium dioxide, carbon black or other pigments may be colored by the new process. For example, cellulose-acetate yarn of low lustre, owing to the presence therein of titanium dioxide, may be colored. Again, a yarn of cellulose-acetate filaments having a grey color due to the presence of carbon black therein may be topped by the new process.

The new process, while of special value in connection with the coloration of textile materials, may be used for the coloring of other materials having one dimension small, e. g., films or foils of cellulose acetate or other cellulose ester or ether.

The invention is illustrated by the following examples:

*Example 1*

1 kilogram of Ciba Blue 2B (Color Index No. 1183) is dissolved in 10 litres of pyridine, 2 kilograms of zinc formaldehyde sulphoxylate added, and the solution diluted with 100 litres of petrol (gasoline) containing 1 kilogram of zinc formaldehyde sulphoxylate. Cellulose acetate yarn is immersed in the resultant yellow solution for one hour at 80° C., and is then washed in cold petrol and dried in the air. The material is thus dyed a blue shade. If desired, the material may be given a short treatment with a 1 gram per litre soap solution containing hydrogen peroxide after the washing and drying.

*Example 2*

1 kilogram of Ciba Red G (Color Index No. 1226) is dissolved in 10 litres of pyridine, 2 kilograms of zinc formaldehyde sulphoxylate added, and the solution diluted with 100 litres of petrol (gasoline) containing 1 kilogram sodium formaldehyde sulphoxylate. Cellulose acetate silk is treated for one hour at 80° C. in the resultant solution, washed with petrol, dried and given a short treatment with a 1 gram per litre soap solution containing hydrogen peroxide. A pink dyeing of good depth and fastness is obtained.

Having described our invention, what we desire to secure by Letters Patent is:

1. Process for the coloration of materials of an organic derivative of cellulose, which comprises forming a dye liquid by dissolving a vat dyestuff in an organic base, reducing said vat dyestuff in the substantial absence of water to form a leuco compound and diluting the resulting composition with a neutral organic liquid, applying the dye liquid thus formed to the materials, and thereafter oxidizing the leuco compound to the vat dyestuff on the material.

2. Process for the coloration of materials of cellulose acetate, which comprises forming a dye liquid by dissolving a vat dyestuff in an organic base, reducing said vat dyestuff in the substantial absence of water to form a leuco compound and diluting the resulting composition with a neutral organic liquid, applying the dye liquid thus formed to the materials, and thereafter oxidizing the leuco compound to the vat dyestuff on the material.

3. Process for the coloration of materials of an organic derivative of cellulose, which comprises forming a dye liquid by dissolving a vat dyestuff in a nitrogenous base in which the nitrogen forms part of a ring, reducing said vat dyestuff in the substantial absence of water to form a leuco compound and diluting the resulting composition with a neutral organic liquid, applying the dye liquid thus formed to the materials, and thereafter oxidizing the leuco compound to the vat dyestuff on the material.

4. Process for the coloration of materials of cellulose acetate, which comprises forming a dye liquid by dissolving a vat dyestuff in a nitrogenous base in which the nitrogen forms part of a ring, reducing said vat dyestuff in the substantial absence of water to form a leuco compound and diluting the resulting composition with a neutrol organic liquid, applying the dye liquid thus formed to the materials, and thereafter oxidizing the leuco compound to the vat dyestuff on the material.

5. Process for the coloration of materials of an organic derivative of cellulose, which comprises forming a dye liquid by dissolving a vat dyestuff in pyridine, reducing said vat dyestuff in the substantial absence of water to form a leuco compound and diluting the resulting composition with a neutral organic liquid, applying the dye liquid thus formed to the materials, and thereafter oxidizing the leuco compound to the vat dyestuff on the material.

6. Process for the coloration of materials of cellulose acetate, which comprises forming a dye liquid by dissolving a vat dyestuff in pyridine, reducing said vat dyestuff in the substantial absence of water to form a leuco compound and diluting the resulting composition with a hydrocarbon liquid, applying the dye liquid thus formed to the materials, and thereafter oxidizing the leuco compound to the vat dyestuff on the material.

HENRY DREYFUS.
ROBERT WIGHTON MONCRIEFF.

CERTIFICATE OF CORRECTION.

Patent No. 2,182,963.                                December 12, 1939.

HENRY DREYFUS, ET AL.

It is hereby certified that error appears in the printed specification of the above numbered patent requiring correction as follows: Page 2, second column, line 25, for the word "subject" read subjected; line 73, for "1183" read 1184; page 3, second column, line 18, claim 4, for "neutrol" read neutral; and that the said Letters Patent should be read with this correction therein that the same may conform to the record of the case in the Patent Office.

Signed and sealed this 23rd day of January, A. D. 1940.

(Seal)
                Henry Van Arsdale,
              Acting Commissioner of Patents.